(12) United States Patent
Yoshikawa et al.

(10) Patent No.: US 6,704,249 B2
(45) Date of Patent: Mar. 9, 2004

(54) MAGNETIC HEAD HAVING AN IRREGULAR SURFACE FOR HEAT DISSIPATION

(75) Inventors: Hiroyasu Yoshikawa, Kawasaki (JP);
Goro Kawasaki, Kawasaki (JP);
Tsuyoshi Matsumoto, Kawasaki (JP);
Tohru Fujimaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 93 days.

(21) Appl. No.: 10/075,759

(22) Filed: Feb. 14, 2002

(65) Prior Publication Data

US 2003/0026174 A1 Feb. 6, 2003

(30) Foreign Application Priority Data

Aug. 3, 2001 (JP) .......................................... 2001-237048

(51) Int. Cl.[7] .............................................. G11B 11/00
(52) U.S. Cl. .................................................... 369/13.23
(58) Field of Search ............................... 369/13.23, 300, 369/112.23, 13.33, 112.22, 13.13

(56) References Cited

U.S. PATENT DOCUMENTS 6,584,045 B1 * 6/2003 Ishii et al. ............... 369/13.23

FOREIGN PATENT DOCUMENTS

| JP | 8-235556 | 9/1996 |
|---|---|---|
| JP | 9-305903 | 11/1997 |
| JP | 2000-090403 | 3/2000 |

OTHER PUBLICATIONS

Machine Translation of JP 2000–090403, Mar. 31, 2003, Kazunori.*

* cited by examiner

Primary Examiner—David Davis
(74) Attorney, Agent, or Firm—Greer, Burns & Crain, Ltd.

(57) ABSTRACT

A magnetic head includes a dielectric member, a coil and a heat conductor. The dielectric member has an obverse surface held in facing relation to a data storage disk. The coil generates a required magnetic field. The coil is provided in the dielectric member or in the obverse surface of the dielectric member. The heat conductor absorbs heat generated by the coil. The heat conductor has a heat conductivity which is higher than that of the dielectric member. The heat conductor has a surface which is at least partially irregular.

4 Claims, 14 Drawing Sheets

MAGNETIC HEAD HAVING AN IRREGULAR SURFACE FOR HEAT DISSIPATION

BACKGROUND OF THE INVENTION

1. Field of the Invention

The present invention relates to a magnetic head used for writing data to or reading data from a magneto-optical disk or a magnetic disk. The term "magnetic head" used in this specification refers to any type of data-writing/reading head provided with a magnetic field generating coil. Thus, for example, the "magnetic head" may refer to a magneto-optical head.

2. Description of the Related Art

When an electric current passes through the coil of a magnetic head for generation of a magnetic field, the coil is heated up. As the temperature of a coil increases, the electric resistance of the coil also increases. Thus, to generate an appropriately strong magnetic field with the coil heated up to a higher temperature, the power supply to the coil needs to be increased. However, with a large power supply, the coil may be overheated, thereby damaging the coil itself and/or the surrounding components of the magnetic head. Further, the large power supply may cause "electromigration" in the coil. As a result, the conductive element of the coil may become thinner or even break due to the growth of a void (in the conductive element) resulting from the electromigration.

Since the heat generation in the coil can lead to the damaging of the coil, an appropriate countermeasure should be provided. One solution is suggested in JP-A-8-235556 which discloses a magnetic head as shown in FIG. 14. This conventional magnetic head includes a slider 91 supported by a suspension 90 in facing relation to a data storage disk D. The slider 91 is provided with a coil 92 for generating a magnetic field. In its bottom surface (facing the disk D), the slider 91 is formed several grooves 93 each of which extends generally in the track direction of the disk D.

With the above arrangements, the slider 91 is caused to float over the disk D in rotation, and the air flowing between the slider 91 and the disk D passes through the grooves 93. The passing air takes away some heat from the slider 91.

While the conventional magnetic head is functional in many respects, it still has some drawbacks in terms of prevention of the temperature rise in the coil 92.

Specifically, the slider 91 is typically made of a synthetic resin, which is not an excellent heat conductor. In addition, the coil 92 is enclosed by a dielectric protection coating made of e.g. silicon oxide which is not an excellent heat conductor, either. Thus, while the exposed surface of the slider 91 is cooled by the high-speed air flow, the temperature of the heated coil may not significantly decrease due to the existence of the materials of low heat conductivity.

Further, though the conventional slider 91 is provided with the grooves 93 for enlarging the heat-dissipating area, each groove 93 has merely a simple, straight configuration whose width is constant over the entire length of the groove. Thus, the passing air may fail to contact with the entire wall surface of the groove 93, and therefore cannot take away a sufficient amount of heat from the slider 91.

SUMMARY OF THE INVENTION

The present invention has been proposed under the circumstances described above. It is, therefore, an object of the present invention to provide a magnetic head which is capable of efficiently preventing the temperature rise in the coil.

According to a first aspect of the present invention, there is provided a magnetic head comprising: a dielectric member including an obverse surface facing a data storage disk; a coil that generates a magnetic field and is held in engagement with the dielectric member; and a heat conductor that takes heat generated by the coil and has a heat conductivity higher than a heat conductivity of the dielectric member. The heat conductor includes an irregular surface.

Preferably, the irregular surface may be exposed from the obverse surface of the dielectric member.

According to a second aspect of the present invention, there is provided a magnetic head comprising: a dielectric member including an obverse surface facing a data storage disk; a coil that generates a magnetic field and is held in engagement with the dielectric member; and a heat conductor that is provided in the dielectric member and includes a first portion and a second portion. The first portion is positioned opposite to the disk with respect to the coil, while the second portion is exposed from the obverse surface of the dielectric member. The heat conductor has a heat conductivity higher than the heat conductivity of the dielectric member.

According to a third aspect of the present invention, there is provided a magnetic head comprising: a coil for generating a magnetic field; and a surface that faces a data storage disk and is formed with a plurality of grooves for allowing air to pass when the disk is rotated. Each groove includes an inlet end for entry of the passing air and an outlet end for exit of the passing air. Each groove becomes narrower from the inlet end to the outlet end.

According to a fourth aspect of the present invention, there is provided a magnetic head comprising: a coil for generating a magnetic field; and a surface facing a data storage disk. This surface includes an irregular portion provided with a plurality of projections spaced from each other in a track direction and a tracking direction of the disk.

Other features and advantages of the present invention will become clearer from the detailed description given below with reference to the accompanying drawings.

DETAILED DESCRIPTION OF THE PREFERRED EMBODIMENTS

Preferred embodiments of the present invention will be described below in detail with reference to the accompanying drawings.

Figure 1:
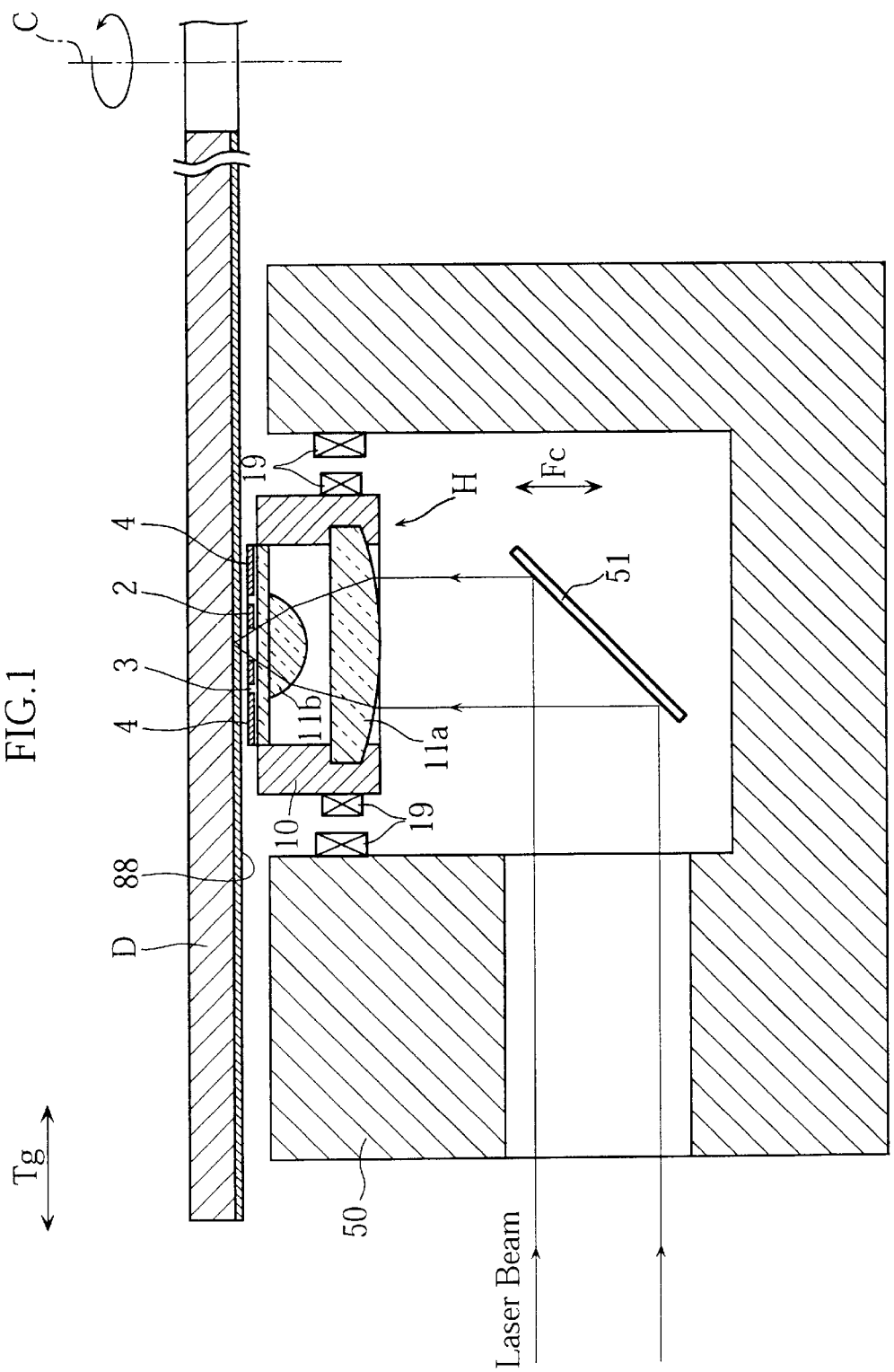
FIG. 1 is a sectional view showing the basic structure of a magnetic head according to a first embodiment of the present invention.
Figure 2:
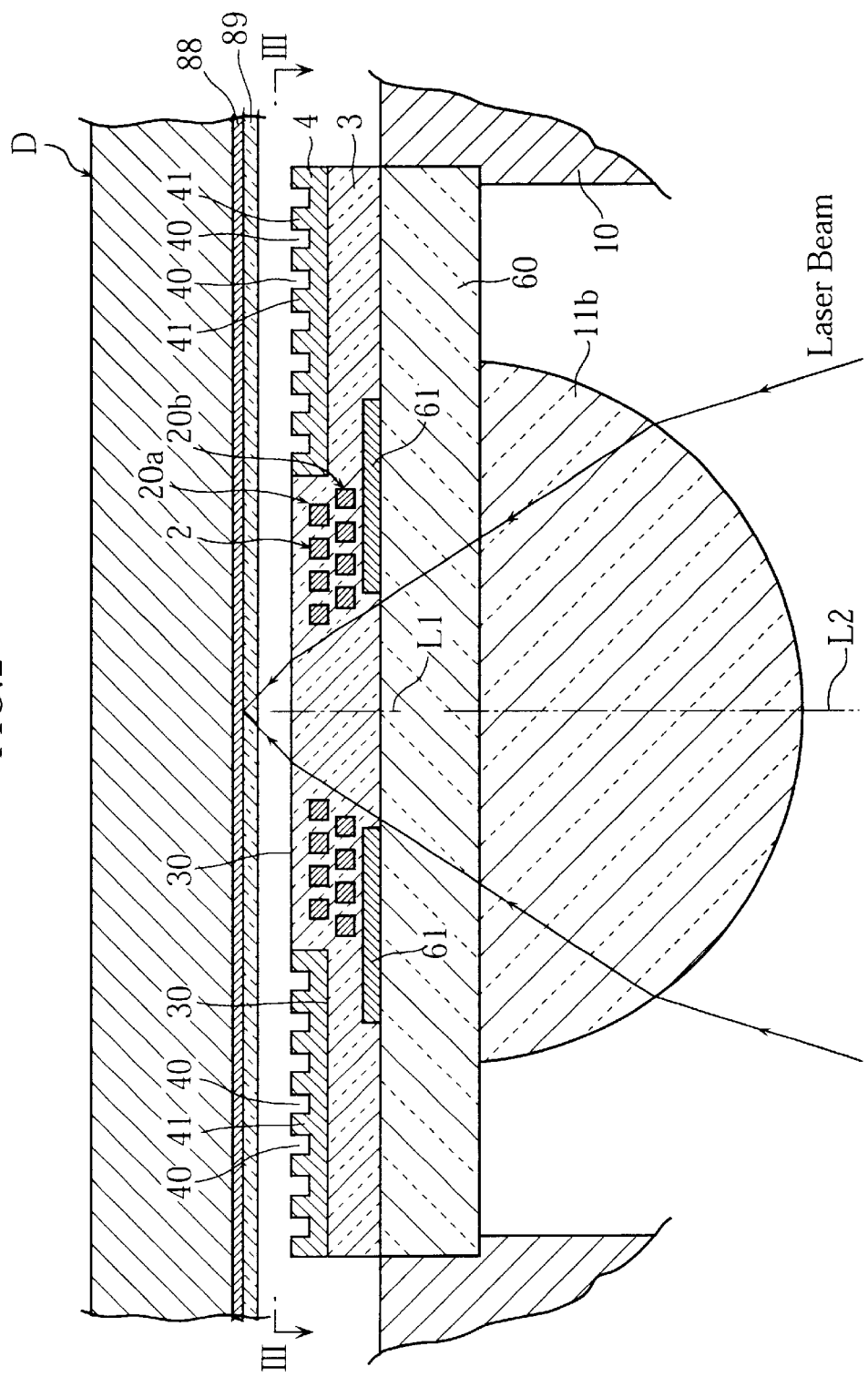
FIG. 2 is a sectional view showing the principal portion of the magnetic head of FIG. 1.
Figure 3:
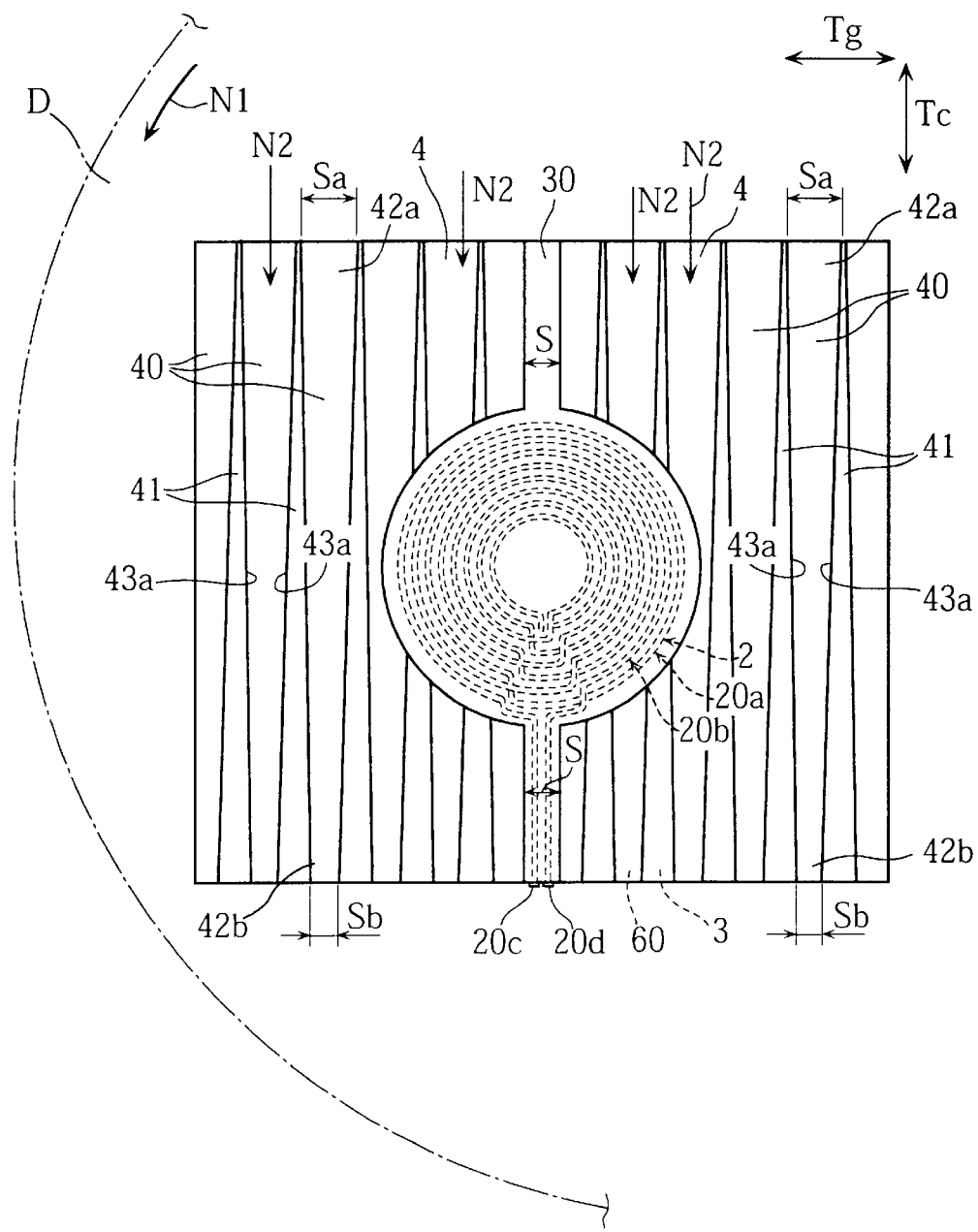
FIG. 3 is a plan view as seen in the direction of arrows III—III in FIG. 2.

FIGS. 1 through 3 illustrate a magnetic head H according to a first embodiment of the present invention. As clearly shown in FIG. 1, the magnetic head H of this embodiment includes a lens holder 10, two objective lenses 11a, 11b held by the lens holder 10, a coil 2 for generating a magnetic field, a dielectric layer 3 for covering the coil 2 and a pair of heat conductive layers 4.

The lens holder 10 is carried by a carriage 50, to be placed under a magneto-optical disk D. Specifically, the lens holder 10 is mounted to the carriage 50 via supporting means movable in the tracking direction, or radially, of the disk D that is indicated by the arrows Tg. Thus, the lens holder 10 is also movable in the direction Tg. Further, the lens holder 10 is movable in the focusing direction indicated by the arrows Fc by an electromagnetic driving means 19. The magneto-optical disk D can be rotated at high speed about the axis C (phantom line) by a spindle motor (not shown). The disk D includes a recording layer 88 provided on a disk surface facing the lens holder 10 (See FIG. 2). Alternatively, the recording layer 88 may be provided on the other side of the disk D. This arrangement, however, may be disadvantageous in that the distance between the recording layer 88 and the coil 2 becomes large, thereby causing a greater loss of the magnetic force. Further, when a laser beam passes through the substrate of the magneto-optical disk D, the laser beam may be adversely affected by the deflection of the substrate. In view of these disadvantages, it is preferable that the recording layer 88 is so arranged as to face the magneto-optical disk D, as in the illustrated embodiment. As shown in FIG. 2, the recording layer 88 is protected by a transparent insulating film 89.

The carriage 50 is movable in the tracking direction Tg by e.g. a voice coil motor (not shown). Seek operation is performed by moving the carriage 50, thereby causing the lens holder 10 to be positioned close to an intended track (target track).

As shown in FIG. 1, a mirror 51 is mounted on the carriage 50 for directing horizontal laser beams upward. The laser beams are emitted from a stationary optical unit (not shown) consisting of a laser diode, a collimating lens, etc. The upward reflected beams pass through the objective lenses 11a and 11b, thereby converging to form a laser spot on the recording layer 88.

The stationary optical unit is provided with a beam splitter and a photo detector. After the upward laser beams are reflected on the recording layer 88, the reflection light is detected by the photo detector. The tracking control and the focus control can be performed by moving the lens holder 10 in an appropriate direction. However, it is also possible to perform the tracking control by changing the inclination angle of the mirror 51, whereby the traveling path of the reflected light is changed in the tracking direction.

As shown in FIG. 2, the coil 2 is formed on a transparent substrate 60 to which the objective lens 11b is attached. The substrate 60 may be rectangular and made of the same glass material as that of the objective lens 11b. The substrate 60 is closely bonded to the objective lens 11b so that there is no gap between them. According to the present invention, instead of forming the coil 2 on the substrate 60, the coil 2 may be directly provided on the objective lens 11b without using the substrate 60.

The coil 2 may be formed by patterning a metal film formed of e.g. copper. The coil 2 has a two-layer structure consisting of first and second spiral elements 20a and 20b. As shown in FIG. 2, the coil 2 has a central axis L1 coinciding with the axis L2 of the objective lens 11b, so that the laser beam, having passed through the objective lens 11b, is not obstructed by the coil 2. As shown in FIG. 3, the spiral elements 20a, 20b are connected to conductive leads which extend up to an edge (side surface) of the dielectric layer 3 or substrate 60. There, the leads are connected to terminals 20c and 20d provided for power supply to the coil 2. As shown in FIG. 2, a magnetic layer 61, made of permalloy for example, is provided below the coil 2. The magnetic layer 61 causes the magnetic field generated by the coil 2 to be applied efficiently to the disk D.

The dielectric layer 3 may be made of a light-permeable dielectric material such as aluminum oxide or silicon oxide. The dielectric layer 3 is formed on the substrate 60 to cover the magnetic layer 61 and the coil 2. The dielectric layer 3 consists of a plurality of dielectric films integrally laminated on each other. The dielectric films may be formed simultaneously with the magnetic layer 61 and the coil 2. Preferably, the dielectric layer 3 has a refractive index which is equal (or substantially equal) to that of the substrate 60 or objective lens 11b.

The heat conductive layers 4 are formed of a metal (copper for example) whose heat conductivity is higher than that of the dielectric layer 3. In the illustrated embodiment, the heat conductive layers 4 serve as a heat sink for the dissipation of the raised temperature of the coil 2, while also serving as a component of a sensor to measure the distance between the disk D and the head H based on the detection of electrostatic capacity. Specifically, the electrostatic capacity between the heat conductive layers 4 and the recording layer 88 varies with the distance between the layers 4 and 88. For example, when the distance increases, the electrostatic capacity decreases. This implies that the distance between the disk D and the head H can be determined based on the value of the electrostatic capacity. The data of the detected distance between the disk D and the head H is utilized for improving the precision of the focus control.

The heat conductive layers 4, which are exposed from the dielectric layer 3, are held in close facing relation to the disk D. As seen from FIG. 3, the heat conductive layers 4 are formed over the obverse surface 30 of the dielectric layer 3 in a manner avoiding the coil 2. The two heat conductive layers 4 are separated from each other by a clearance extending radially of the coil 2. The sign S indicates the width of the clearance. The separation serves to prevent the generation of unduly strong induced currents in the layers 4 when a high-frequency current is applied to the coil 2 for writing data to the disk D by magnetic field modulation. As a result, it is possible to prevent the magnetic field generated by the coil 2 from being unacceptably weakened by the magnetic field generated by the induced currents in the layers 4.

The heat conductive layers 4 have a non-flat obverse surface facing the magneto-optical disk D. Specifically, the obverse surface is formed with a plurality of grooves 40 (conversely, a plurality of projections 41). Each of the grooves 40 extends in the track direction indicated by the arrow Tc. The width of the groove 40 is not constant over the length thereof. Specifically, in the embodiment shown in FIG. 3 wherein the disk D rotates counterclockwise (see the arrow N1), each groove 40 has a greater width Sa at its upstream end 42a and a smaller width Sb at its downstream end 42b. The groove 40 tapers regularly from the upstream end 42a to the downstream end 42b. In other words, the longitudinal side surfaces 43a defining the groove 40 are nonparallel to each other, but come closer to each other as proceeding from the upstream end 42a to the downstream end 42b.

The heat conductive layers 4 may be made by a process shown in FIGS. 4A–4E.

Figure 4A:
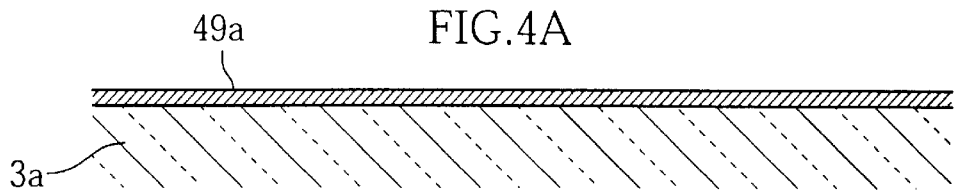
FIGS. 4A–4E illustrate a process for making a heat conductive layer.
Figure 4B:
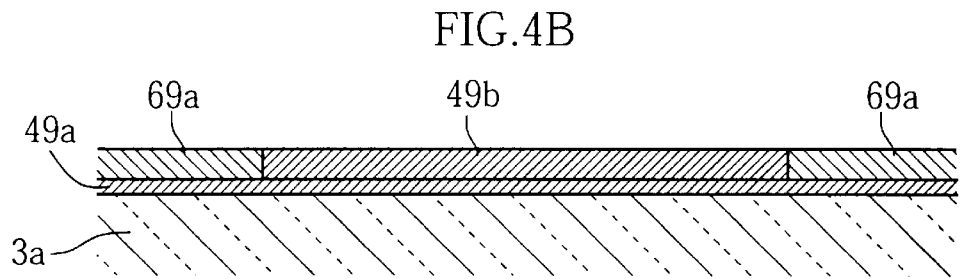
Figure 4C:
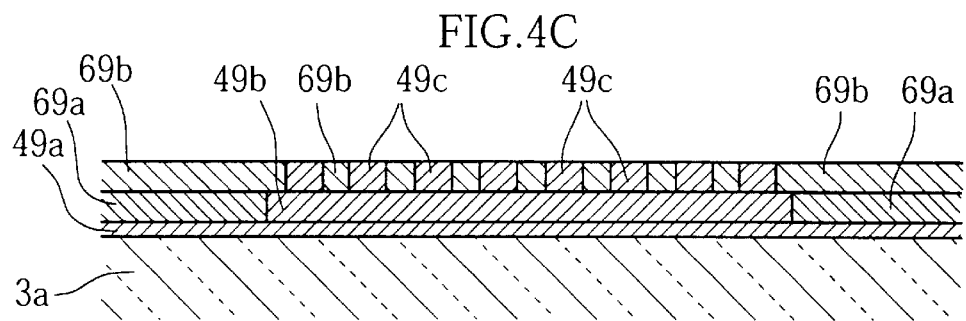
Figure 4D:
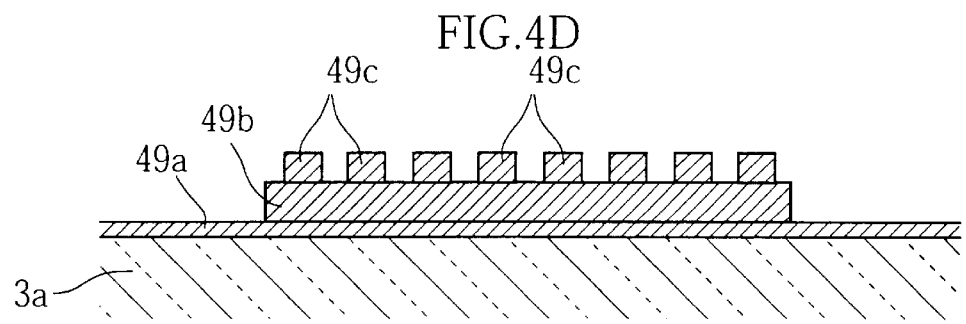
Figure 4E:
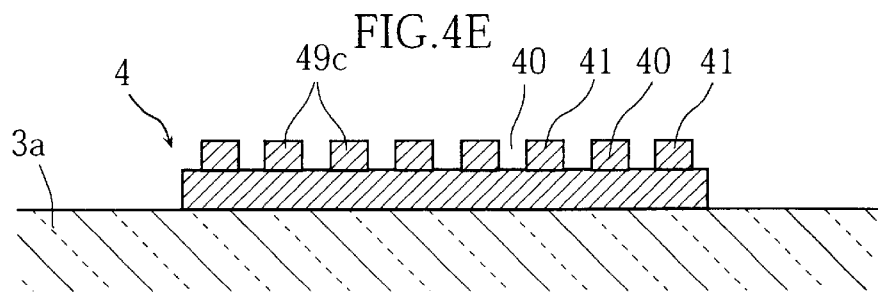

First, as shown in FIG. 4A, a copper base layer 49a is formed on a dielectric substrate 3a by sputtering or vapor deposition for example. Then, as shown in FIG. 4B, a first resist mask 69a is formed on the copper base layer 49a. The mask 69a may be made by forming a resist layer on the copper base layer 49a and then subjecting the resist layer to light exposure and development. After the mask 69a is provided, an additional copper layer 49b is formed (by plating for example) on such portions of the copper base layer 49a that are not covered by the mask 69a. Then, as shown in FIG. 4C, a second resist mask 69b is formed on the first resist mask 69a and the additional copper layer 49b. The second mask 69b is provided with a plurality of slits on the additional copper layer 49b. These slits are filled up with copper material 49c. Then, as shown in FIG. 4D, the first and the second resist masks 69a, 69b are removed. Then, unnecessary portions of the copper base layer 49a are removed by ion milling for example. As a result, a heat conductive layer 4 as shown in FIG. 4E is obtained.

The function of the magnetic head H will now be described. For writing data to a magneto-optical disk D by the magnetic field modulation, a laser beam is shone on a target track in the recording layer 88. In this operation, the relevant magnetic material in the recording layer 88 is heated up to a Curie temperature. At the same time, a high-frequency current is applied to the coil 2 to change the direction of the magnetic flux of the magnetic field. In this way, the direction of magnetization of the magnetic material constituting the recording layer 88 is controlled. During this data writing operation, the heat generated by the coil 2 is partly transferred through the dielectric layer 3 to the heat conductive layers 4, to be dissipated into the surrounding air. Since each of the heat conductive layers 4 has a high heat conductivity and has an irregular exposed surface (which means a large heat conduction area), unwanted heat can be efficiently dissipated through the heat conductive layer 4.

In the illustrated embodiment, the rotation of the magneto-optical disk D gives rise to high-velocity air flow between the disk D and the heat conductive layer 4, whereby the heat conductive layer 4 is positively cooled. As indicated by the arrow N2 in FIG. 3, the surrounding air flows into the grooves 40 at their wider end 42a, going to the smaller end 42b. Since each groove 40 tapers from the wider end 42a to the smaller end 42b, as described above, the high-velocity cooling air comes into sufficient contact with the longitudinal side surfaces 43a of the groove 40. As a result, the heat conductive layer 4 is cooled more effectively than is conventionally possible.

The efficient heat dissipation through the heat conductive layers 4 satisfactorily suppresses the temperature rise in the coil 2. Thus, it is possible to prevent the occurrence of the electromigration in the coil 2. Further, the restricted temperature rise in the coil 2 leads to prevention of an increase in the electric resistance of the coil 2. Therefore, it is possible to prevent the increase of power consumption and hence an additional temperature rise in the coil 2 caused by the increased power consumption.

In the above embodiment, the heat conductive layers 4 serve for two purposes, that is, as a heat sink for cooling the coil 2 and as a component of a sensor for detecting the distance between the disk D and the magnetic head H. This is advantageous to reducing the number of parts needed to compose the magnetic head H. Accordingly, the head H can be produced more readily and with reduced manufacturing cost.

Figure 5:
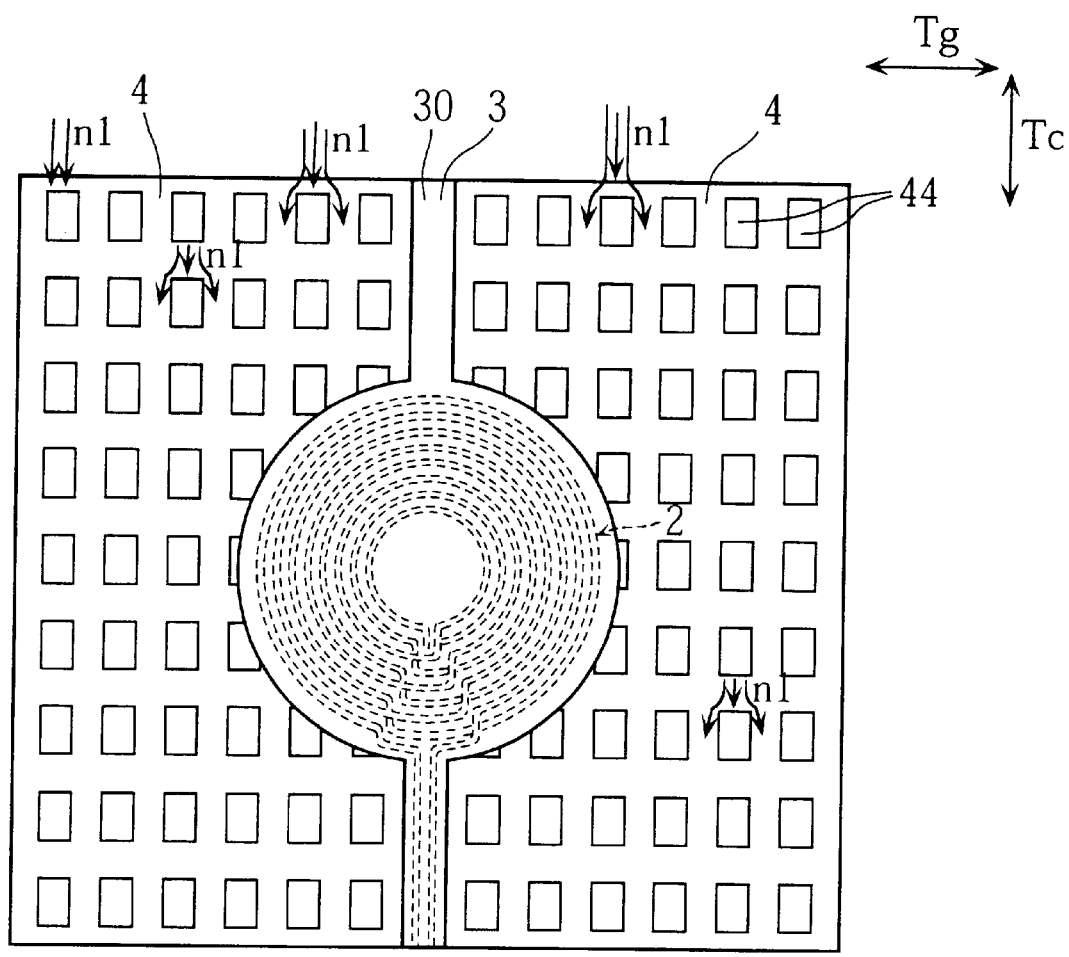
FIG. 5 is a plan view showing a modified irregularity arrangement of the heat conductive layer shown in FIG. 3.
Figure 6:
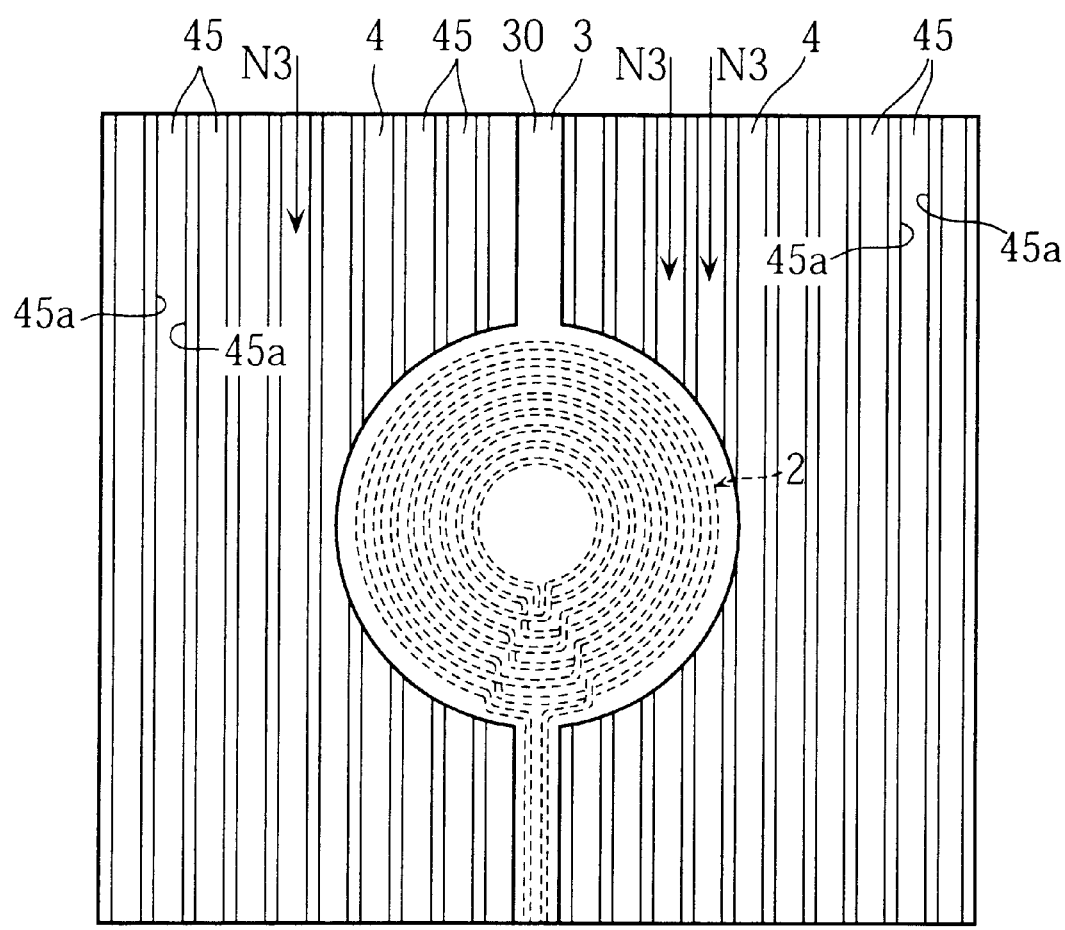
FIG. 6 is a plan view showing another modified irregularity arrangement of the heat conductive layer shown in FIG. 3.

FIGS. 5 and 6 show possible modifications of the heat conductive layer arrangement shown in FIG. 3.

By the arrangement shown in FIG. 5, the heat conductive layers 4 are provided with a plurality of projections 44 having a rectangular cross section. The projections 44 are regularly spaced from each other in the tracking direction Tg and the track direction Tc. In other words, the projections 44 are arranged in a matrix. With such a structure, the matrix arrangement of the projections 44 increases the surface area of the heat conductive layer 4, which is advantageous to ensuring effective cooling of the coil 2. Further, when the air flows between the disk D and the heat conductive layer 4 upon rotation of the magneto-optical disk D, the high-velocity air hits against the projections 44, as indicated by the arrows n1. This enhances the cooling effect for the coil 2.

By the arrangement shown in FIG. 6, the heat conductive layer 4 is provided with a plurality of non-tapering grooves 45 having a constant width. Each of the grooves 45 is defined by a pair of longitudinal side surfaces 45a extending parallel to each other. This arrangement may lessen the cooling effect for the layer 4 (and hence the coil 2) as compared to the arrangements shown in FIG. 3 or 5. However, the straight groove arrangement of FIG. 6 is still effective for cooling the coil 2 as compared to a case where no grooves or projections are formed in the layer 4.

Figure 7:
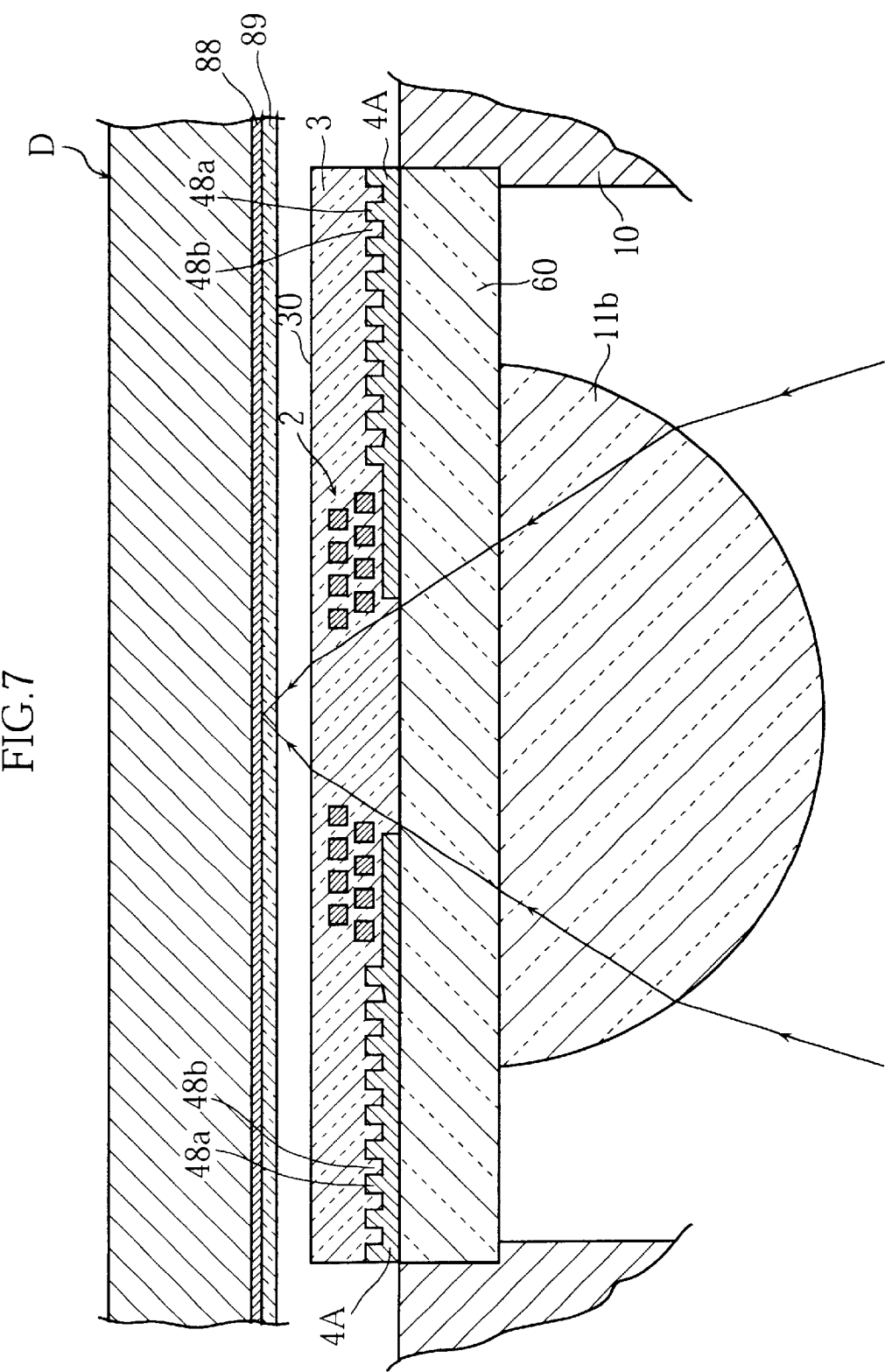
FIG. 7 is a sectional view showing the basic structure of a magnetic head according to a second embodiment of the present invention.

FIG. 7 shows the principal structure of a magnetic head according to a second embodiment of the present invention. In the second embodiment, heat conductive layers 4A are embedded in the dielectric layer 3 so that they are not exposed from the upper surface 30 of the dielectric layer 3. Generally, the layers 4A are disposed below the coil 2 to be located at a lower position than the coil 2. The layers 4A are a better heat conductor than the dielectric layer 3. The layers 4A are made of a magnetic material and perform the same function as the magnetic layer 61 of the first embodiment (see FIG. 2). The heat conductive layers 4A are formed over a relatively large area of the obverse surface of the substrate 60. The upper surface of the heat conductive layer 4A is formed with a plurality of projections 48a or grooves 48b.

The heat conductive layers 4A are provided with an enlarged surface area due to the non-flat upper surface. Also, the layers 4A are made to have a higher heat conductivity than the dielectric layer 3. Thus, unwanted heat generated at the coil 2 can be effectively dissipated through the conductive layers 4A.

Figure 8:
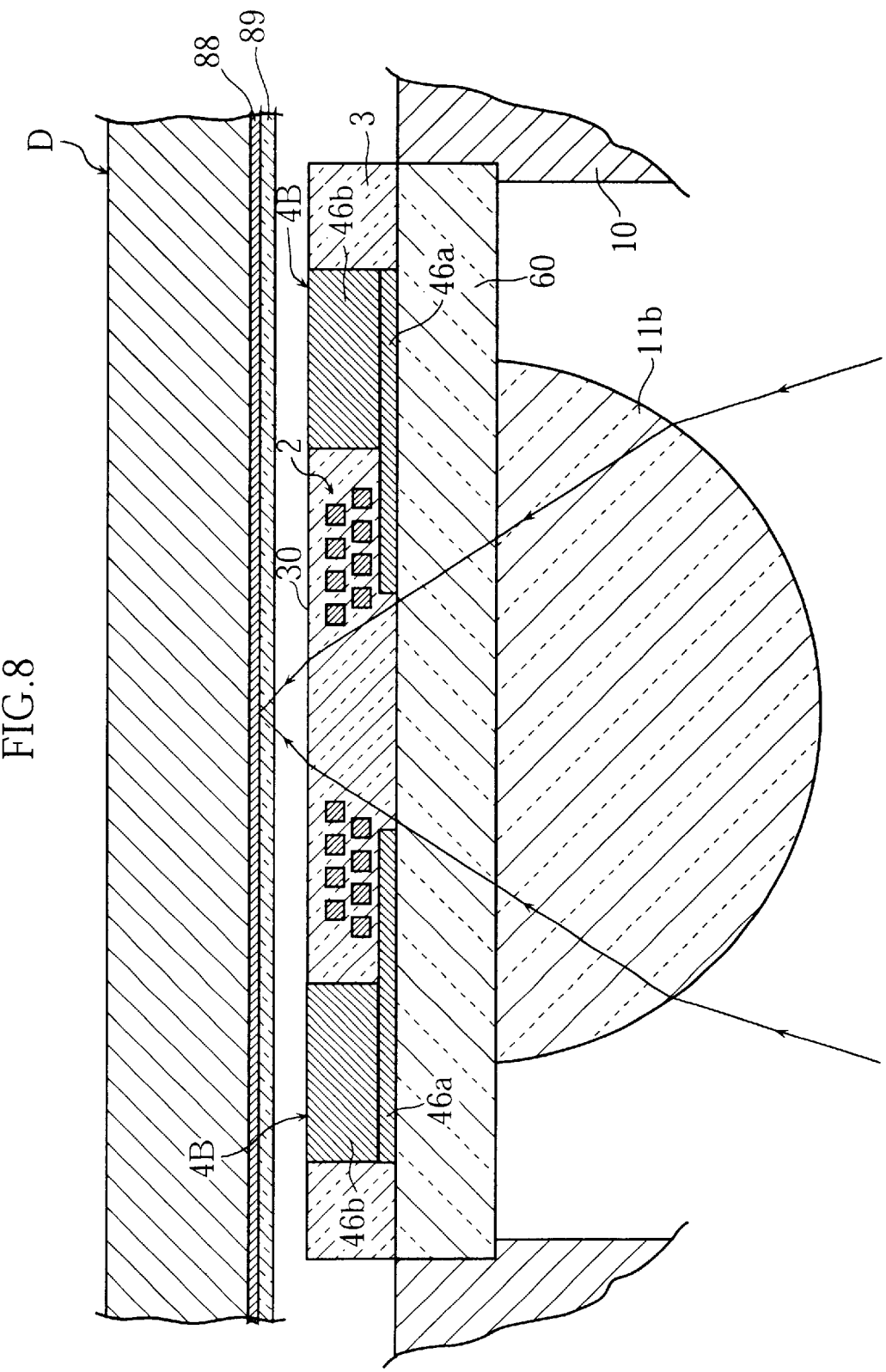
FIG. 8 is a sectional view showing the basic structure of a magnetic head according to a third embodiment of the present invention.

FIG. 8 shows the principal structure of a magnetic head according to a third embodiment of the present invention. In this embodiment, the magnetic head includes a heat conductor 4B consisting of a first element 46a and a second element 46b. The first element 46a, which is thinner than the second element 46b, is held in contact with the substrate 60. The second element 46b is held in contact with the first element 46a on its bottom side, while on its upper side, the second element 46b is exposed from the dielectric layer 3 to face the disk D. The first and the second elements 46a, 46b are both better heat conductor than the dielectric layer 3. The first element 46a is made of a magnetic material and performs the same function as the magnetic layer 61 shown in FIG. 2. The first element 46a extends under and adjacent to the coil 2.

With this structure, the heat which is generated by the coil 2 and conducted toward the substrate 60 can be absorbed by the first element 46a, then conducted to the second element 46b, and finally dissipated into the air via the exposed surface of the second element 46b. In this manner, the unwanted heat which would otherwise be trapped inside the dielectric layer 3 can be positively dissipated into the air via the heat conductor 4B.

Figure 9:
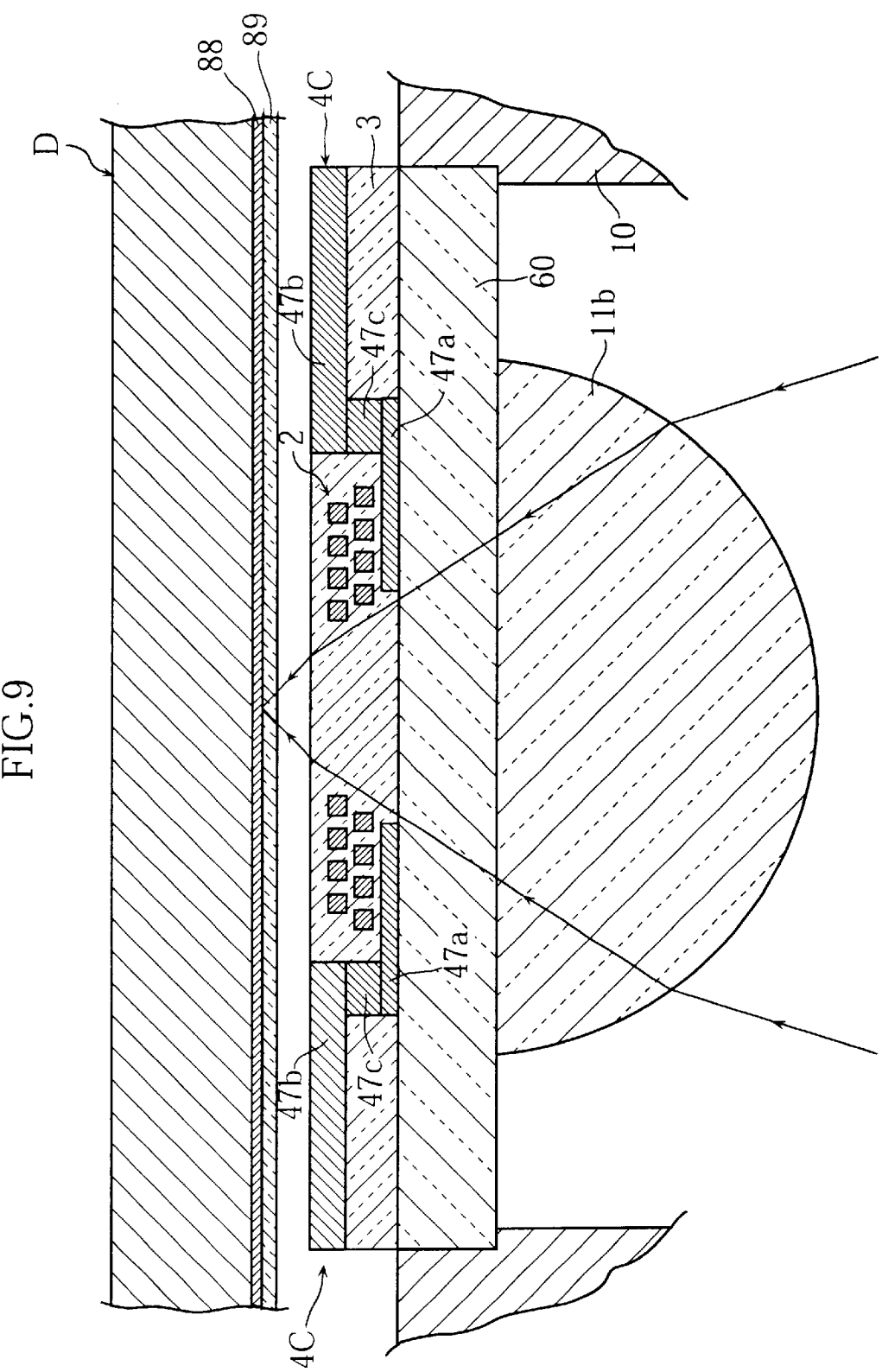
FIG. 9 is a sectional view showing the basic structure of a magnetic head according to a fourth embodiment of the present invention.

FIG. 9 shows the principal structure of a magnetic head according to a fourth embodiment of the present invention. In this embodiment, a pair of heat conductors 4C is provided in the dielectric layer 3. Each heat conductor 4C consists of a first or lower element 47a, a second or upper element 47b and a third or intermediate element 47c. The first element 47a, made of a magnetic material, is disposed below the coil 2 and adjacent to the substrate 60. The second element 47b has an obverse surface exposed from the dielectric layer 3. The third element 47c connects the first element 47a to the second element 47b. The second element 47b may be larger than the first element 47a.

With this structure, the heat generated by the coil 2 is effectively dissipated into the surrounding air via the heat conductor 4C.

Figure 10:
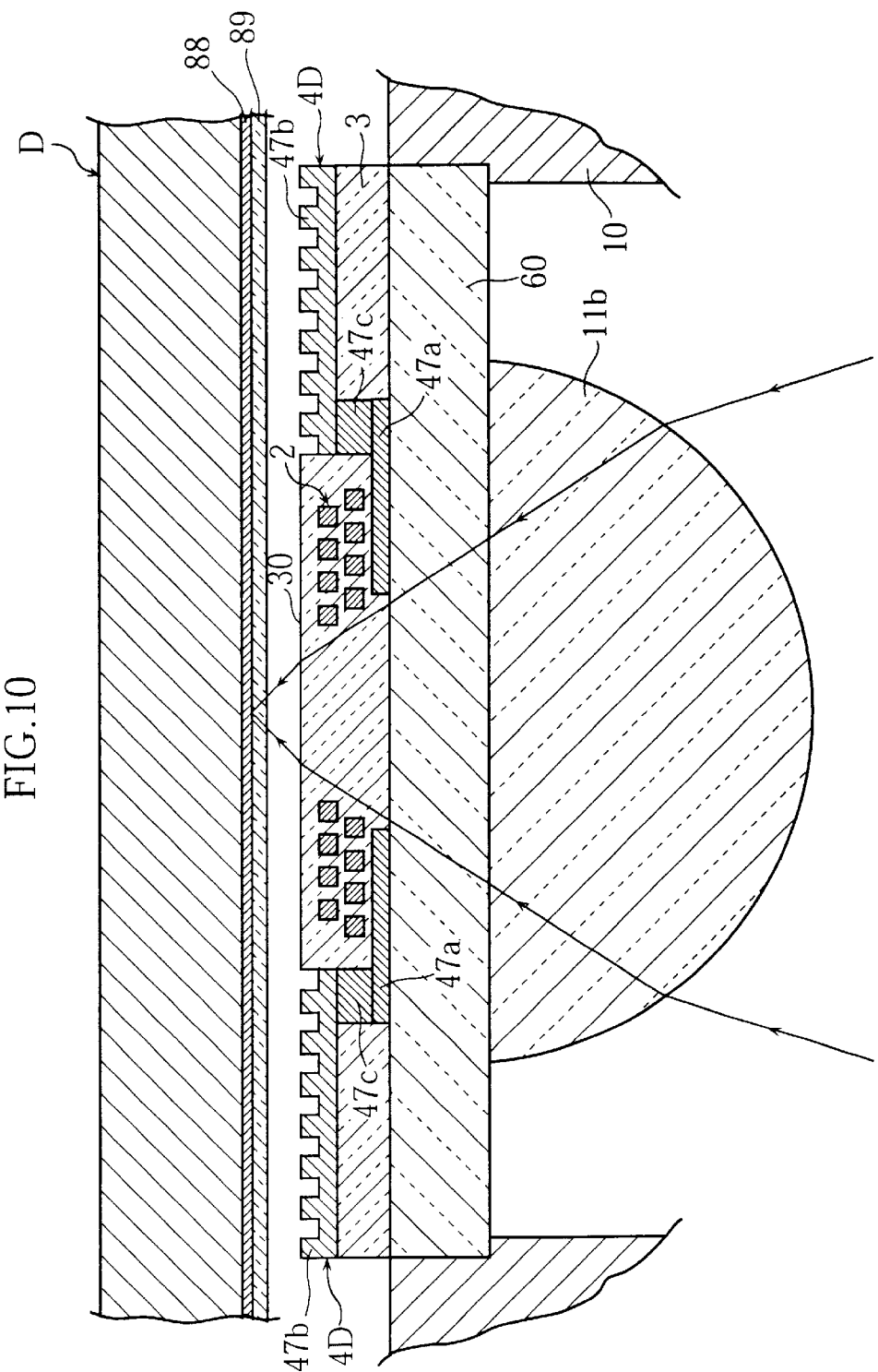
FIG. 10 is a sectional view showing the basic structure of a magnetic head according to a fifth embodiment of the present invention.

FIG. 10 shows the principal structure of a magnetic head according to a fifth embodiment of the present invention. The magnetic head of this embodiment is basically the same as the magnetic head of the fourth embodiment (FIG. 9) except that the heat conductor 4D includes a second element 47b whose obverse surface (exposed surface) is formed with a plurality of projections 47b for increasing the heat dissipating area. The projections 47b may be the same as those shown in FIG. 3, 5 or 6.

Figure 11:
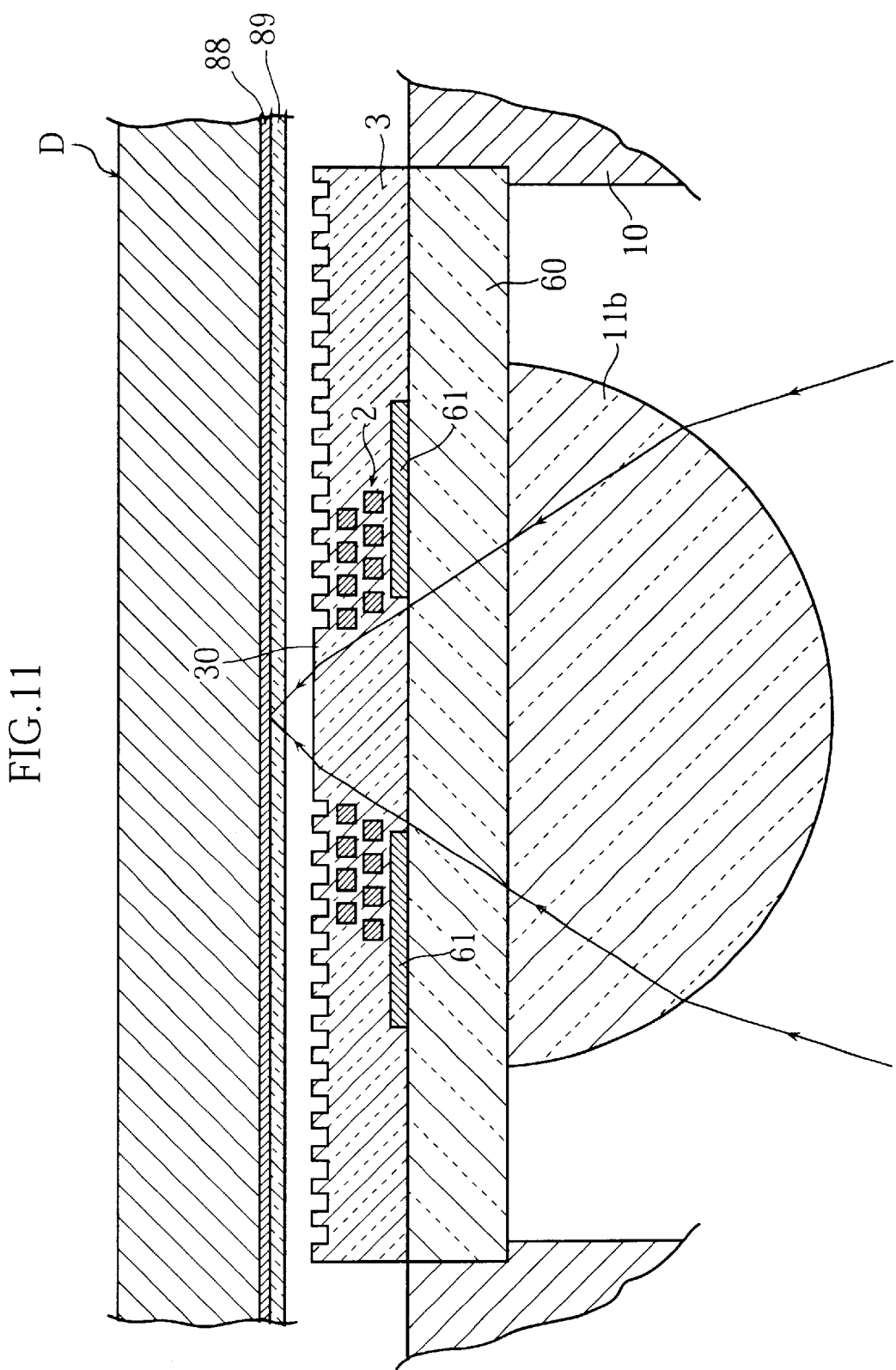
FIG. 11 is a sectional view showing the basic structure of a magnetic head according to a sixth embodiment of the present invention.
Figure 12:
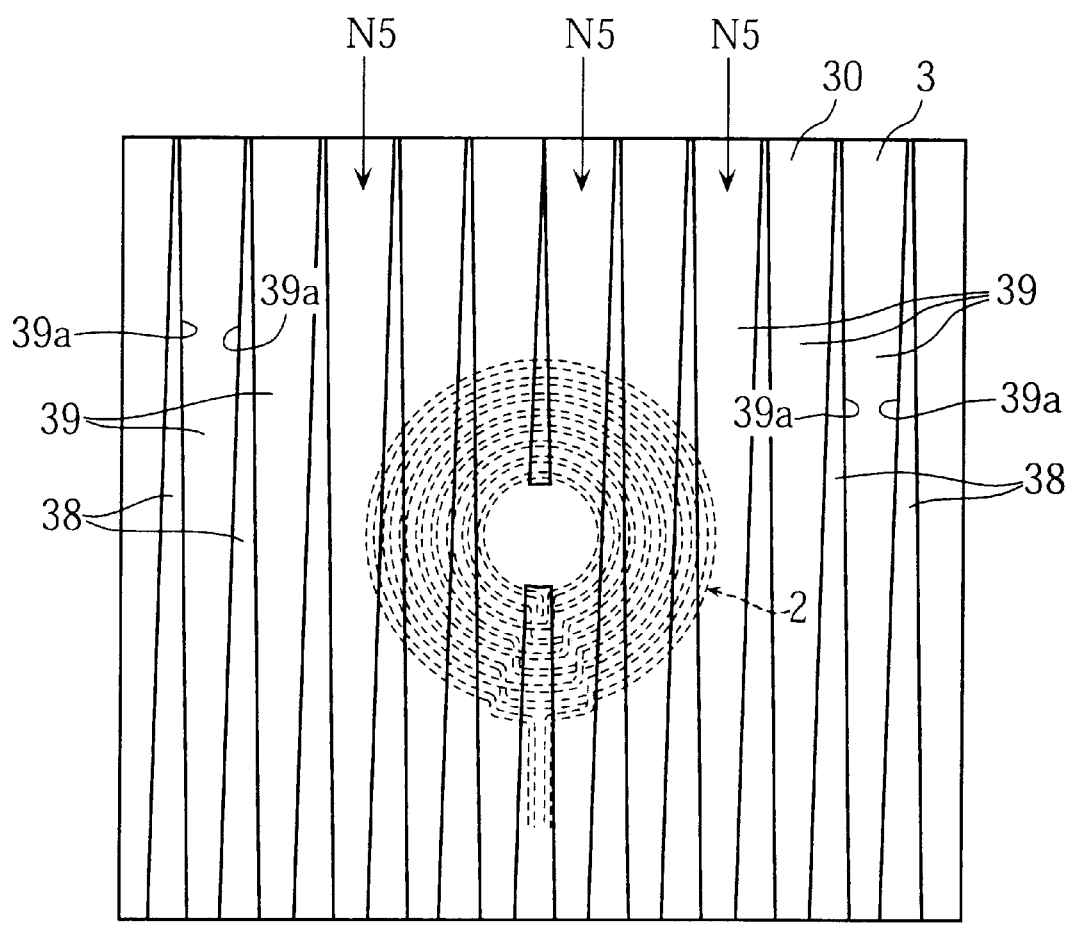
FIG. 12 is a plan view showing the surface configuration of the dielectric layer of the magnetic head shown in FIG. 11.

FIGS. 11 and 12 show the principal structure of a magnetic head according to a sixth embodiment of the present invention. In this embodiment, the dielectric layer 3 has a non-flat obverse surface 30 which is entirely irregular except for the portion for passing the laser beam. The obverse surface 30 may have the same configuration as that of the irregular surface of the heat conductive layer 4 shown in FIG. 3 or 5. Specifically, as shown in FIG. 12, the obverse surface 30 of the dielectric layer 3 may be formed with a plurality of grooves 39 (or a plurality of projections 38). The width of each groove 39 is defined by two wall surfaces 39a which gradually come closer to each other as proceeding in the air flow direction indicated by arrows N5.

Figure 13:
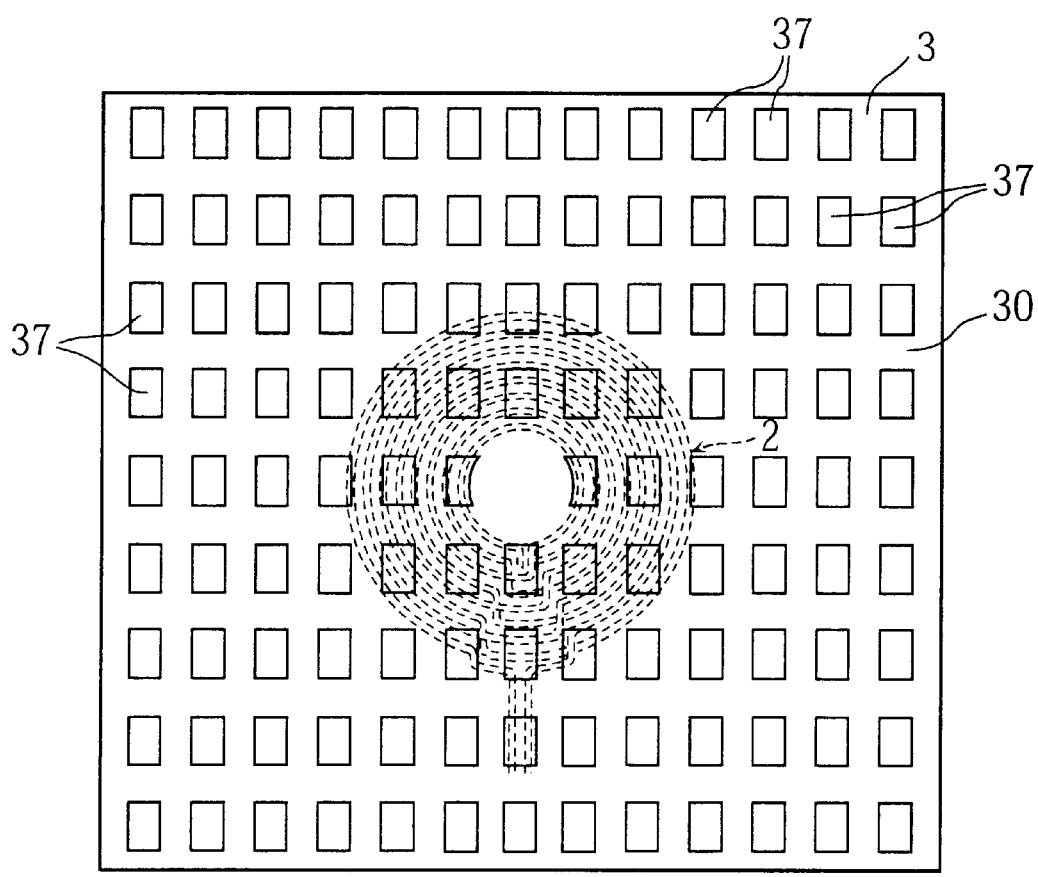
FIG. 13 is a plan view showing a modified irregularity arrangement of the dielectric layer of the magnetic head shown in FIG. 11.
Figure 14:
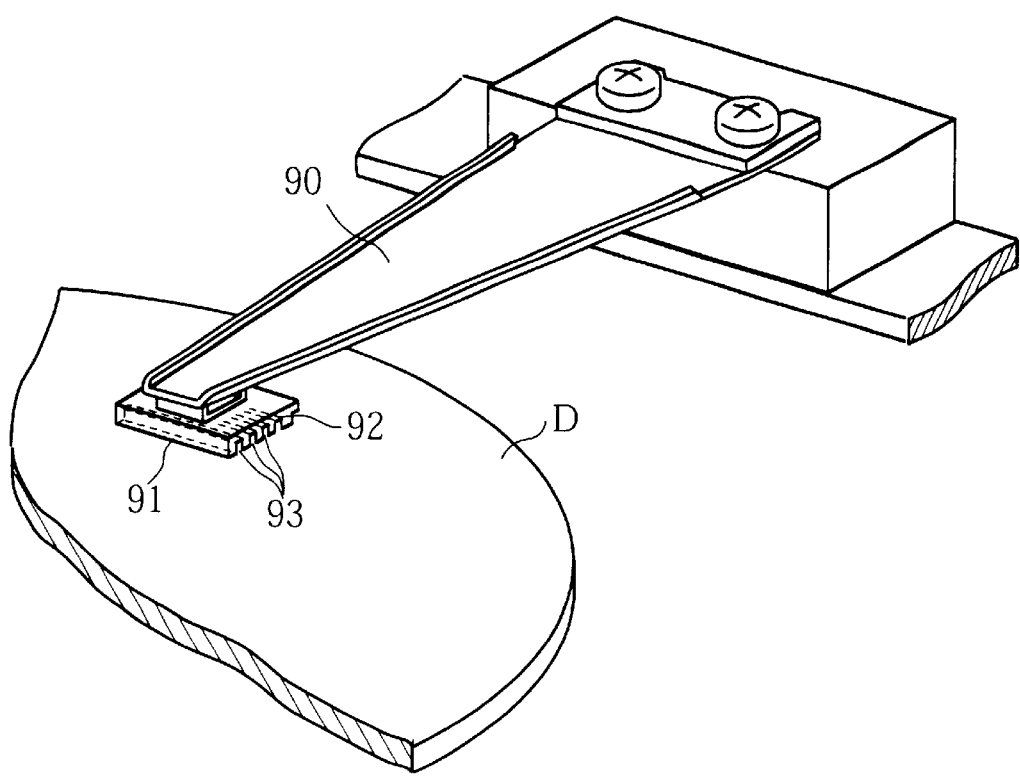
FIG. 14 shows a conventional magnetic head and some cooperating components.

The irregularity of the exposed surface 30 of the dielectric layer 3 maybe provided by the matrix arrangement of projections 37 shown in FIG. 13. As illustrated, each projection 37 has a rectangular cross section. This matrix arrangement is similar to that of the heat conductive layer 4 shown in FIG. 5 and can enjoy the same advantages.

The present invention being thus described, it is obvious that the same may be varied in many ways. Such variations are not to be regarded as a departure from the spirit and scope of the present invention, and all such modifications as would be obvious to those skilled in the art are intended to be included within the scope of the following claims.

What is claimed is:

1. A magnetic head comprising:
   a dielectric member including an obverse surface facing a data storage disk;
   a coil that generates a magnetic field and is held in engagement with the dielectric member; and
   a heat conductor that takes heat generated by the coil and has a heat conductivity higher than a heat conductivity of the dielectric member, the heat conductor including an irregular surface;
   wherein the irregular surface is exposed from the obverse surface of the dielectric member.

2. The magnetic head according to claim 1,
   wherein the irregular surface is formed with a plurality of grooves for allowing air to pass when the disk is rotated, each groove including an inlet end for entry of the passing air and an outlet end for exit of the passing air; and
   wherein each groove becomes narrower from the inlet end to the outlet end.

3. The magnetic head according to claim 1,
   wherein the irregular surface provided with a plurality of projections spaced from each other in a tangential direction and a radial direction of the disk.

4. A magnetic head comprising:
   a dielectric member including an obverse surface facing a data storage disk;
   a coil that generates a magnetic field and is held in engagement with the dielectric member; and
   a heat conductor that is provided in the dielectric member and includes a first portion and a second portion, the first portion being positioned opposite to the disk with respect to the coil, the second portion being exposed from the obverse surface of the dielectric member, the heat conductor having a heat conductivity higher than a heat conductivity of the dielectric member.

\* \* \* \* \*

UNITED STATES PATENT AND TRADEMARK OFFICE
CERTIFICATE OF CORRECTION

PATENT NO. : 6,704,249 B2  Page 1 of 1
DATED : March 9, 2004
INVENTOR(S) : Yoshikawa et al.

It is certified that error appears in the above-identified patent and that said Letters Patent is hereby corrected as shown below:

Column 8,
Line 41, insert -- is -- between "surface" and "provided".

Signed and Sealed this

Twenty-seventh Day of July, 2004

JON W. DUDAS
*Acting Director of the United States Patent and Trademark Office*